(12) United States Patent
Nishikata et al.

(10) Patent No.: US 8,975,797 B2
(45) Date of Patent: Mar. 10, 2015

(54) DISK-ROTATING MOTOR AND DISK-DRIVING DEVICE

(75) Inventors: Toshiyuki Nishikata, Tokyo (JP); Kumio Masuda, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 430 days.

(21) Appl. No.: 13/520,448

(22) PCT Filed: Mar. 4, 2010

(86) PCT No.: PCT/JP2010/001498
§ 371 (c)(1),
(2), (4) Date: Jul. 3, 2012

(87) PCT Pub. No.: WO2011/083521
PCT Pub. Date: Jul. 14, 2011

(65) Prior Publication Data
US 2013/0049505 A1   Feb. 28, 2013

(30) Foreign Application Priority Data

Jan. 5, 2010 (JP) ................................ 2010-000384

(51) Int. Cl.
*H02K 7/08* (2006.01)
*F16C 33/10* (2006.01)
(Continued)

(52) U.S. Cl.
CPC .............. *F16C 33/1065* (2013.01); *F16C 17/10* (2013.01); *G11B 19/2009* (2013.01); *H02K 5/1675* (2013.01); *F16C 35/02* (2013.01); *H02K 7/08* (2013.01); *F16C 2370/12* (2013.01)
USPC ............ 310/90; 310/89; 310/156.01; 29/596; 360/98.07; 360/98.08; 360/99.08

(58) Field of Classification Search
CPC ........ H02K 5/1675; H02K 7/08; F16C 17/10; F16C 33/1065; F16C 35/02; F16C 2370/12; G11B 19/2009
USPC .............. 310/89, 90, 156; 29/596; 360/98.07, 360/98.08, 99.08
IPC ........................................................ H02K 7/08
See application file for complete search history.

(56) References Cited

U.S. PATENT DOCUMENTS 5,610,462 A * 3/1997 Takahashi ....................... 310/90
6,242,830 B1   6/2001 Katagiri
(Continued)

FOREIGN PATENT DOCUMENTS

CN   1288230 A   3/2001
CN   101174780 A  5/2008
(Continued)

OTHER PUBLICATIONS

Chinese Office Action dated May 20, 2014 issued in counterpart CN patent application 201080002798.3.

*Primary Examiner* — John K Kim
(74) *Attorney, Agent, or Firm* — Carrier Blackman & Associates, P.C.; Joseph P. Carrier; William D. Blackman

(57) ABSTRACT

A disk-rotating motor includes a rotor section including a rotor magnet attached to a rotor frame and a shaft fixed to a center of the rotor frame, and a stator section including a shaft-bearing which bears the shaft, wherein the stator section includes the shaft-bearing, a shaft-bearing housing which holds the shaft-bearing, a thrust plate which bears the shaft in an axis direction, a stator core which is arranged to face the rotor magnet and provided with wire-winding, a core holder which holds the stator core, and a bracket which holds the shaft-bearing housing. The bracket has a projecting part which fixes the shaft-bearing at a central part thereof, an inner diameter part of the shaft-bearing is press-fitted to be tightened to the projecting part, and an outer diameter part of the shaft-bearing housing is adhered to be tightened to an inner diameter part of the core holder.

5 Claims, 6 Drawing Sheets

(51) Int. Cl.
*F16C 17/10* (2006.01)
*G11B 19/20* (2006.01)
*H02K 5/167* (2006.01)
*F16C 35/02* (2006.01)

(56) References Cited

U.S. PATENT DOCUMENTS

| | | | |
|---|---|---|---|
| 6,567,268 B1 * | 5/2003 | Hsieh | 361/695 |
| 6,837,622 B2 * | 1/2005 | Gomyo et al. | 384/100 |
| 7,474,023 B2 * | 1/2009 | Nishikata et al. | 310/67 R |
| 7,638,912 B2 * | 12/2009 | Nishikata et al. | 310/90 |
| 8,484,669 B2 * | 7/2013 | Smirnov et al. | 720/697 |
| 8,782,678 B2 * | 7/2014 | Nishikata et al. | 720/710 |
| 8,836,182 B2 * | 9/2014 | Nishikata et al. | 310/67 R |
| 2005/0200216 A1 * | 9/2005 | Brown | 310/90 |
| 2006/0006746 A1 | 1/2006 | Nishikata et al. | |
| 2007/0120433 A1 * | 5/2007 | Sugiyama et al. | 310/90 |
| 2010/0187932 A1 * | 7/2010 | Kawai et al. | 310/156.12 |
| 2013/0049505 A1 * | 2/2013 | Nishikata et al. | 310/90 |

FOREIGN PATENT DOCUMENTS

| | | |
|---|---|---|
| JP | 8-289523 A | 11/1996 |
| JP | 9-317771 A | 12/1997 |
| JP | 2000-125505 A | 4/2000 |
| JP | 2003-244890 A | 8/2003 |
| JP | 2005-172223 A | 6/2005 |
| JP | 2006-050889 A | 2/2006 |

* cited by examiner

RELATED ART

US 8,975,797 B2

DISK-ROTATING MOTOR AND DISK-DRIVING DEVICE

TECHNICAL FIELD

The present invention relates to a disk-rotating motor and a disk-driving device for rotating and driving a disk such as optical disk like CD or DVD, and more particularly, to a shaft-bearing holding structure and a tightening of a shaft-bearing holding member.

BACKGROUND ART

Conventionally, for a shaft-bearing holding structure configured in a disk-rotating motor which is used in a disk-driving device which requires a thinning and size-reduction, a variety of shaft-bearing holding structures such as a shaft-bearing holding structure which uses a sintered member of the same material as a shaft-bearing, a shaft-bearing holding structure which uses a cutting processing member made of brass, and the like have been suggested. Also, in order to cope with a recent trend of the rapid cost-down, it is required to configure the shaft-bearing holding structure by combining members as inexpensive as possible. At the same time, the needs for reliability are also increased. Particularly, regarding a shaft-bearing holding structure for vehicle mount, the shock resistance and the vibration resistance are important requirements. In addition, the requirement for the assembling precision becomes also stricter so as to cope with a large capacity medium such as Blu-ray.

As a representative example of a configuration of combining inexpensive members while securing high reliability, a structure has been also suggested in which a shaft-bearing holding mechanism is configured only by metal press processing products.

For example, conventionally, as such disk-rotating motor, a disk-rotating motor shown in FIG. 5 has been suggested (for example, refer to Patent Document 1). The disk-rotating motor includes a rotor section 101 and a stator section 102. Burring processing is implemented at a substantial central part of a bracket 103 of the stator section 102. The burring part 104 includes, at an inner diameter part thereof, a shaft-bearing 106 rotatably bearing a shaft 105 and functions as a shaft-bearing housing. Also, the burring part 104 is provided at its entrance with a thrust cap 107 which supports load of the rotor section 101 in a thrust direction and is press-fitted and fixed while providing a thrust plate 108 having wear resistance.

Also, a conventional disk-rotating motor shown in FIG. 6 includes a rotor section 109 and a stator section 110. Burring processing is implemented at a substantial central part of a bracket 111 of the stator section 110. A cup-shaped shaft-bearing housing 113 integrally having a bottom surface at one end side of a cylindrical part is press-fitted and fixed to the burring part 112. The shaft-bearing housing 113 is fitted at an inner diameter part thereof with a shaft-bearing 115 for bearing a shaft 114 and supports load of the rotor section 109 in a thrust direction while providing a thrust plate 116 having wear resistance on a bottom surface part thereof (for example, refer to Patent Document 2).

Also, a conventional disk-rotating motor shown in FIGS. 7A and 7B includes a rotor section 119 and a stator section 120. A bracket 121 of the stator section 120 is formed at a substantial central part thereof with a recess part 123 into which an outer periphery of a shaft-bearing housing 122 is fitted. A bottom surface thereof supports a shaft 125 via a thrust plate 124. Also, as shown in FIG. 7B, the recess part 123 is formed therein a groove part 126 into which a base end of the shaft-bearing housing 122 is connected. A projecting part 127 for welding is formed in the groove part 126, so that the bracket 121 and the shaft-bearing housing 122 are welded and tightened (for example, refer to Patent Document 3).

In the meantime, recently, for the disk-rotating motor which is used in a disk-driving device, the cost-down, the high reliability and the high precision are required in addition to the size-reduction and the thinning However, in the shaft-bearing holding structure shown in FIG. 5, as the motor is smaller and thinner, an axial length of press fitting the thrust cap 107 is shortened, so that the tightening strength is lowered. Hence, as the motor is made to be smaller, there occurs a problem where the holding strength becomes insufficient in the support of the load of the rotor section 101 in the thrust direction. Even when the adhesion were also used for fixing, an adhesion area is decreased. Hence, it is not possible to expect the sufficient strength. Also, the adhesive flows to a shaft-bearing, so that the reliability may be degraded. Also, the fixing by the welding is difficult to implement due to its structural reason. In view of the assembling precision, particularly a distance variation from a motor fixing position to a rotational center upon the assembling, according to the method of press fitting an outer diameter part of the shaft-bearing, since the outer diameter part of the shaft-bearing is worn upon the press fitting and the coaxial precision between the outer diameter part and the inner diameter part is accumulated, there is a limit in securing the high precision.

Also in the shaft-bearing holding mechanism shown in FIG. 6, as the motor becomes smaller and thinner, the lengths of the shaft-bearing housing 113 and the bracket 111 in the press-fitting axial direction are shortened and the tightening strength is decreased. In this configuration, in order to support the load of the rotor section 101 in the thrust direction, like the shaft-bearing holding mechanism shown in FIG. 5, it is necessary to support an outer diameter step part 117 of the shaft-bearing housing 113 with a burring part end face 118 of the bracket 111. When it is compulsory to make the motor smaller and thinner, it is difficult to satisfy the tightening strength of the shaft-bearing housing 113 and the shaft-bearing 115 fitted in the inner diameter thereof and the tightening strength of the shaft-bearing housing and the bracket 111 at the same time.

Also in the shaft-bearing holding structure shown in FIG. 6, the fixing by the welding is difficult to implement due to its structural reason, like the configuration shown in FIG. 5. Also, the fixing by the adhesion is not useful because the adhesive may flow to a lower surface of the bracket. Also, like the configuration shown in FIG. 5, the distance variation from the motor fixing position to the rotational center has a limit in securing the high precision because a variation such as plate thickness of the shaft-bearing housing is accumulated.

In any case, it is clear that as the motor becomes smaller and thinner, it is difficult to secure the tightening strength only by the press fitting fixing. Hence, a structure is preferable in which the high support rigidity for the load of the rotor section in the thrust direction is secured and the shaft-bearing housing employs a tightening method, other than the press-fitting fixing only, which can be performed based on the high reliability.

Compared to the above, the shaft-bearing holding structure shown in FIG. 7 is fitted and held in the recess part 123 of the bracket 121. Thereby, since the bracket 121 axially supports the shaft 125 and secures the support rigidity for the load of the rotor section 119 in the thrust direction, the high reliability can be secured. Also, according to this conventional shaft-bearing holding mechanism, the groove part 126 for fitting the shaft-bearing housing 122 is further formed in the bottom surface of the recess part 123 for fitting with the shaft-bearing housing 122, which is formed at the central part of the bracket 121. Thereby, this conventional shaft-bearing holding mechanism has a function of preventing sputters, which are generated upon the fixing by the welding, from being introduced into the shaft-bearing or a function of preventing the adhesive, which flows out upon the fixing by the adhesion, from being introduced, thereby enabling the tightening by the welding or adhesion. However, only the base end of the shaft-bearing housing 122 is tightened. Therefore, when the vibration is applied, an opposite end face of the shaft-bearing housing 122 may be elastically deformed. Thus, it cannot be said that the reliability is very high in a device for vehicle mount in which the vibration is excessively generated.

Also, according to the shaft-bearing holding mechanism shown in FIG. 7, since the distance variation from the motor fixing position to the rotational center completely depends on the precision of an assembly jig, tolerances of parts are not accumulated, which is favorable. However, there is a limit in securing the high precision in view of the wear of the jig or maintenance precision while considering the mass production.

CITATION LIST

Patent Literature

Patent Document 1: JP-A-H08-289523
Patent Document 2: JP-A-2000-125505
Patent Document 3: JP-A-2006-50889

SUMMARY OF INVENTION

A disk-rotating motor of the present invention includes a rotor section including a rotor magnet attached to a rotor frame and a shaft fixed to a center of the rotor frame; and a stator section including a shaft-bearing which bears the shaft. The stator section includes the shaft-bearing, a shaft-bearing housing which holds the shaft-bearing, a thrust plate which bears the shaft in an axis direction, a stator core which is arranged to face the rotor magnet and provided with wire-winding, a core holder which holds the stator core, and a bracket which holds the shaft-bearing housing. The bracket is formed with a projecting part which fixes the shaft-bearing at a central part thereof, an inner diameter part of the shaft-bearing is press-fitted to be tightened to the projecting part, and an outer diameter part of the shaft-bearing housing is adhered to be tightened to an inner diameter part of the core holder.

According to the above configuration, since the bracket has a function of supporting load of the rotor section in a thrust direction, the holding force thereof is not influenced by the member tightening. Also, since the bracket can be integrally formed by press processing, the member is relatively inexpensive, the number of parts can be reduced and the assembling operability is also improved.

Also, the inner diameter of the shaft-bearing, which is a rotational center of a motor, is directly press-fitted. Thus, a distance variation from a motor fixing position to the rotational center can be secured just by the precision of the single item of the bracket, so that the super-high precision can be secured. Also, the shaft-bearing housing and the bracket can be tightened based on the high reliability by the combination use of the press fitting and the adhesion, so that it can be easily configured in a motor which requires the thinning and the size-reduction. Since it is possible to secure a large area for tightening the shaft-bearing housing, the motor can be useful in a device for vehicle mount with the excessive vibration.

EMBODIMENT FOR CARRYING OUT INVENTION

Hereinafter, embodiments of the present invention will be described with reference to the drawings.

(Embodiments)

Figure 1:
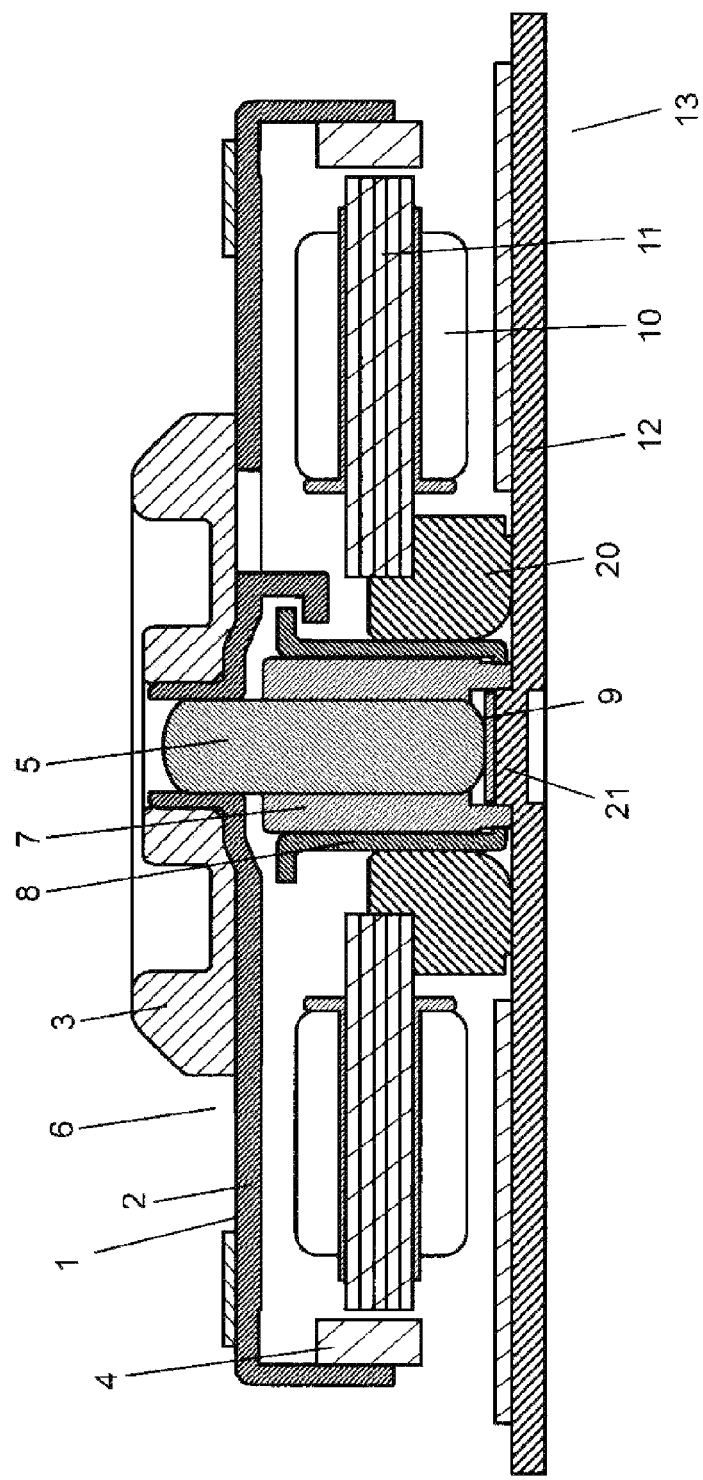
FIG. 1 is a sectional view showing a structure of a disk-rotating motor according to an embodiment of the present invention.

FIG. 1 is a sectional view showing a structure of a disk-rotating motor according to an embodiment of the present invention. In FIG. 1, the disk-rotating motor includes a rotor section 6 and a stator section 13.

The rotor section 6 includes a turntable part 1, a rotor frame 2, a disk-aligning member 3, a rotor magnet 4 and a shaft 5.

The rotor frame 2 has a substantial cup shape made of metal, and the shaft 5 is fixed to a center of the rotor frame 2. The rotor magnet 4 having a ring shape is fixed on a cylindrical inner periphery of the rotor frame 2. Also, a disk such as optical disk, like CD and DVD is mounted on the turntable part 1 which is a circular plane part of an upper surface of the rotor frame 2. Also, the rotor section 6 includes the disk-aligning member 3 having a substantially circular shape so as to align an inner diameter part of the disk. The disk-aligning member 3 supports the disk together with the turntable part 1.

In the meantime, the stator section 13 includes a shaft-bearing 7, a shaft-bearing housing 8, a thrust plate 9, a stator core 11, a core holder 20 and a bracket 12.

The shaft-bearing 7 rotatably bears the shaft 5. The thrust plate 9 axially bears the shaft. The shaft-bearing housing 8 holds the shaft-bearing 7 on an inner periphery thereof. Also, the stator core 11 is disposed at the inner periphery-side of the rotor frame 2 so that it faces the rotor magnet 4. A wire 10 is wound on the stator core 11. The core holder 20 holds the stator core 11. Also, the bracket 12 holds the shaft-bearing housing 8 and the core holder 20.

On the bracket 12, the core holder 20, the shaft-bearing housing 8, the bearing 7 and the shaft 5 are arranged in this order toward a rotational center of the motor. A projecting part 21 for press-fitting and supporting the shaft-bearing 7 is formed at a central part of the bracket 12, which is positioned at a lower surface of the shaft 5. Also, a gap which is set to have a size appropriate for adhesion tightening is formed between an inner diameter part of the core holder 20 and an outer diameter part of the shaft-bearing housing 8. The shaft-bearing housing 8 is integrally molded to have a substantially circular shape and is configured such that the shaft-bearing 7 can be fitted into an inner diameter part thereof. The shaft-bearing 7 is inserted into the inner diameter part of the shaft-bearing housing 8. At this time, the shaft-bearing 7 is directly press-fitted into the shaft-bearing housing 8 such that the inner diameter part of the shaft-bearing 7 is fitted to the projecting part 21 formed at the central part of the bracket 12 and the outer periphery of the shaft-bearing 7 is fitted to the inner periphery of the shaft-bearing housing 8. Accordingly, the shaft-bearing 7 is fixed to the bracket 12. That is, the shaft-bearing 7 is press-fitted to be tightened to the projecting part 21 formed at the central part of the bracket 12, and the shaft-bearing housing 8 is press-fitted to be fixed to the outer periphery of the shaft-bearing 7. Also, after the press-fitting fixing, the core holder 20 and the shaft-bearing housing 8 are adhered to be fixed using the above-mentioned gap.

Since the disk-rotating motor has the above configuration, the bracket 12 has a function of supporting the load of the rotor section 6 in a thrust direction and the holding force thereof is not influenced by the member tightening. Also, since the bracket 12 can be integrally formed by press processing, the member is relatively inexpensive, the number of parts can be reduced and the assembling operability is also improved.

Also, the disk-rotating motor has the configuration where the inner diameter part of the shaft-bearing 7, which is a rotational center of the motor, is directly press-fitted to the projecting part 21 formed at the central part of the bracket 12. That is, the rotational center of the disk-rotating motor is substantially determined at the position of the projecting part 21 formed at the central part of the bracket 12. Thus, a distance variation from a motor fixing position to the rotational center when installing the disk-rotating motor in a disk-driving device can be secured just by the precision of the single item of the bracket, so that the high precision can be secured, which cannot be secured in the conventional structure. Also, since the adhesion tightening by the outer diameter part of the shaft-bearing housing 8 is used jointly, it is possible to secure the sufficient strength even for the vehicle mount usage in which the requirement for the reliability is particularly strict.

Figure 2A:
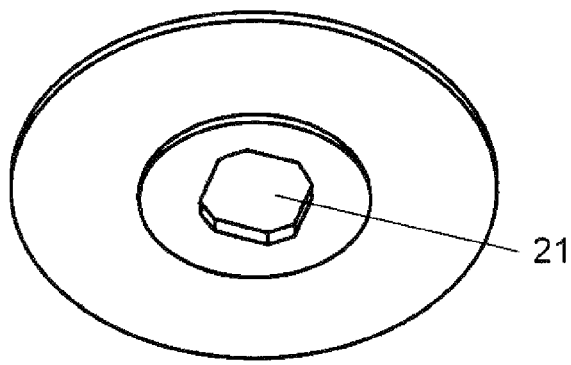
FIG. 2A is a perspective view showing a vicinity of a projecting part formed at a central part of a bracket of the disk-rotating motor.
Figure 2B:
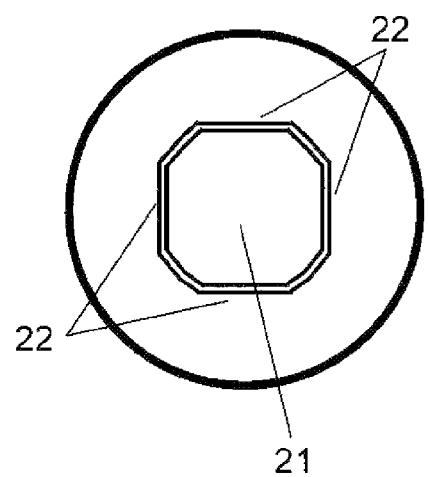
FIG. 2B is a plan view showing the vicinity of the projecting part.
Figure 2C:
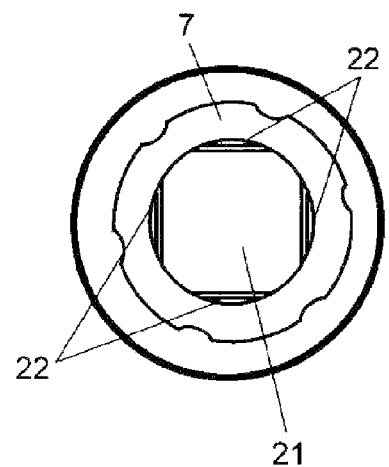
FIG. 2C is a plan view showing the vicinity of the projecting part after press fitting a shaft-bearing.

FIG. 2A is a perspective view showing a vicinity of the projecting part 21 formed at the central part of the bracket 12 of the disk-rotating motor in an embodiment of the present invention, FIG. 2B is a plan view showing the vicinity of the projecting part 21 and FIG. 2C is a plan view showing the vicinity of the projecting part 21 after press fitting the shaft-bearing 7. As shown in FIGS. 2A to 2C, the projecting part 21 is formed with notches 22 at an outer periphery thereof. Thereby, as shown in FIG. 2C, after press fitting the shaft-bearing 7, gaps are formed at positions of the notches 22 between the projecting part 21 and the shaft-bearing 7.

Figure 3:
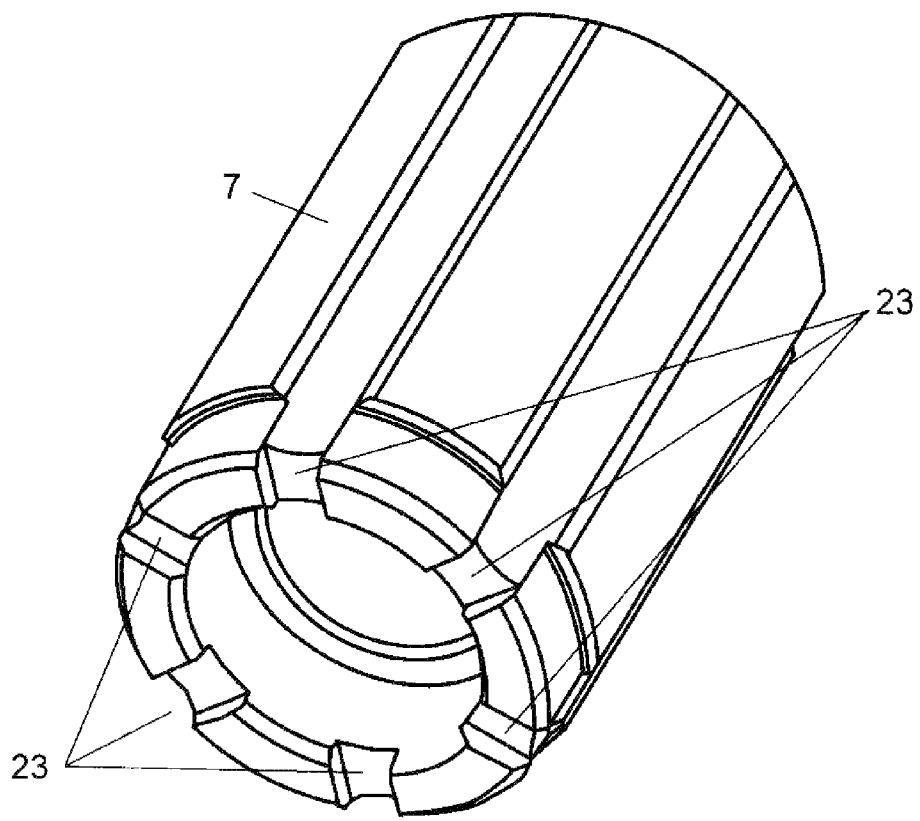
FIG. 3 is a perspective view showing a bracket contact surface side of the shaft-bearing.

Also, FIG. 3 is a perspective view showing a bracket contact surface side of the shaft-bearing 7 of the disk-rotating motor in an embodiment of the present invention. The bracket contact surface side of the shaft-bearing 7 is formed with grooves 23. Thus, after press fitting the shaft-bearing 7, gaps are also formed at positions of the grooves 23 between the shaft-bearing 7 and the bracket 12.

That is, since the disk-rotating motor has the notches 22 and the grooves 23, it is possible to push out the air in the shaft-bearing, which is expanded due to heat generated by the rotation of the motor, to the outside. That is, according to the disk-rotating motor, the notches 22 for air discharge are formed on the outer periphery of the projecting part 21 formed at the central part of the bracket 12. Also, according to the disk-rotating motor, the grooves 23 for air discharge are formed at the bracket contact surface side of the shaft-bearing 7. Thereby, it is possible to prevent the oil impregnated in the shaft-bearing 7 from flowing out, which is favorable in view of the motor lifetime.

Figure 4:
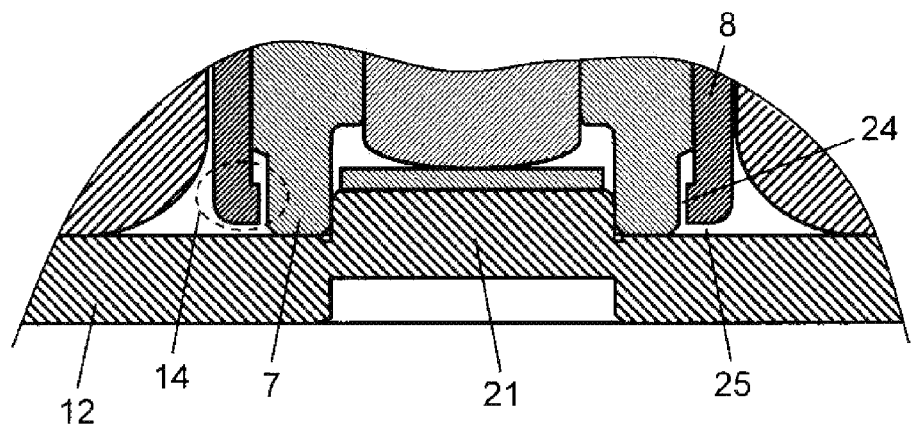
FIG. 4 is an enlarged sectional view showing a vicinity of a bracket-side end part of a shaft-bearing housing.
Figure 5:
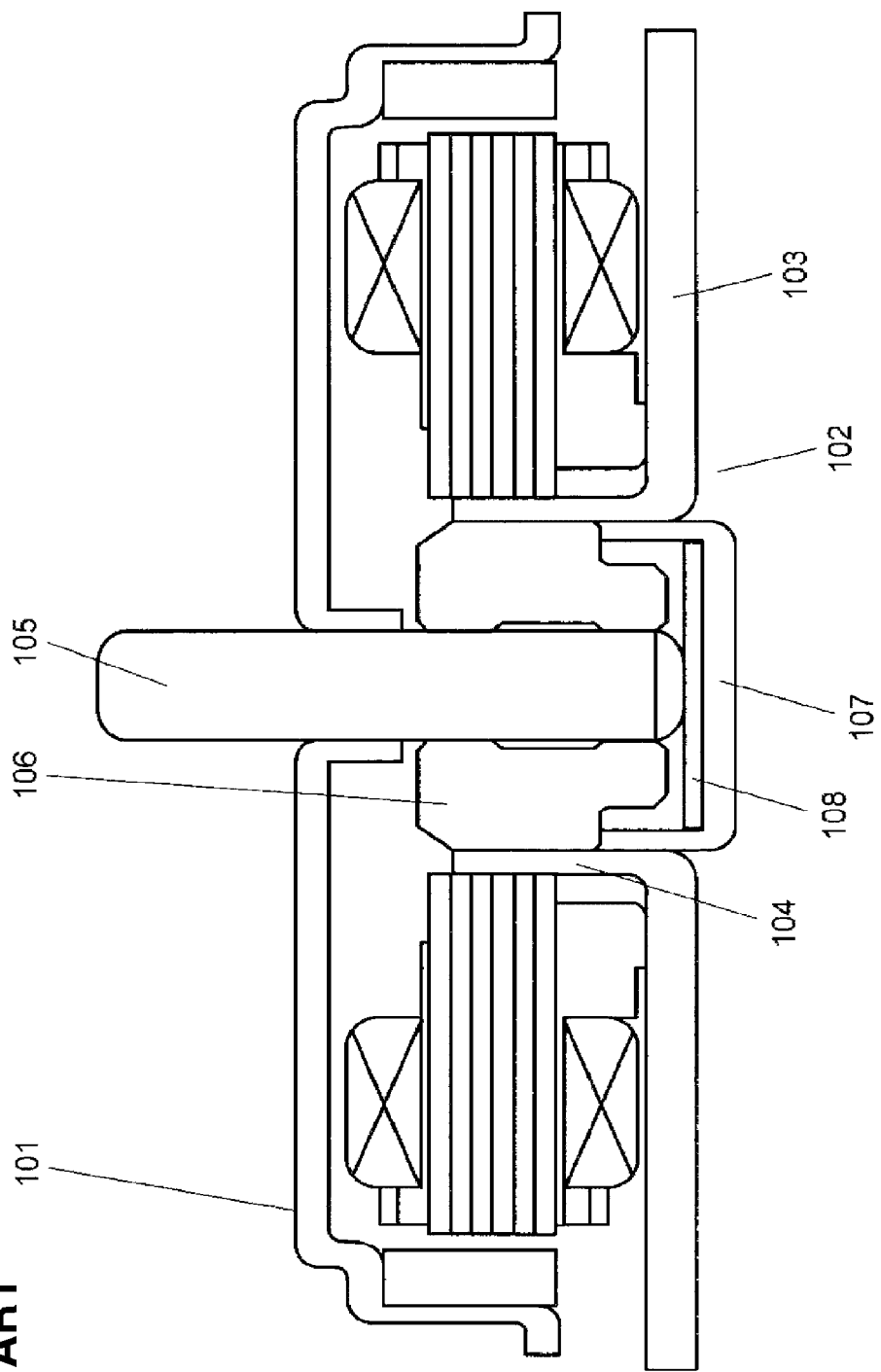
FIG. 5 is a sectional view showing a structure of a conventional disk-rotating motor.
Figure 6:
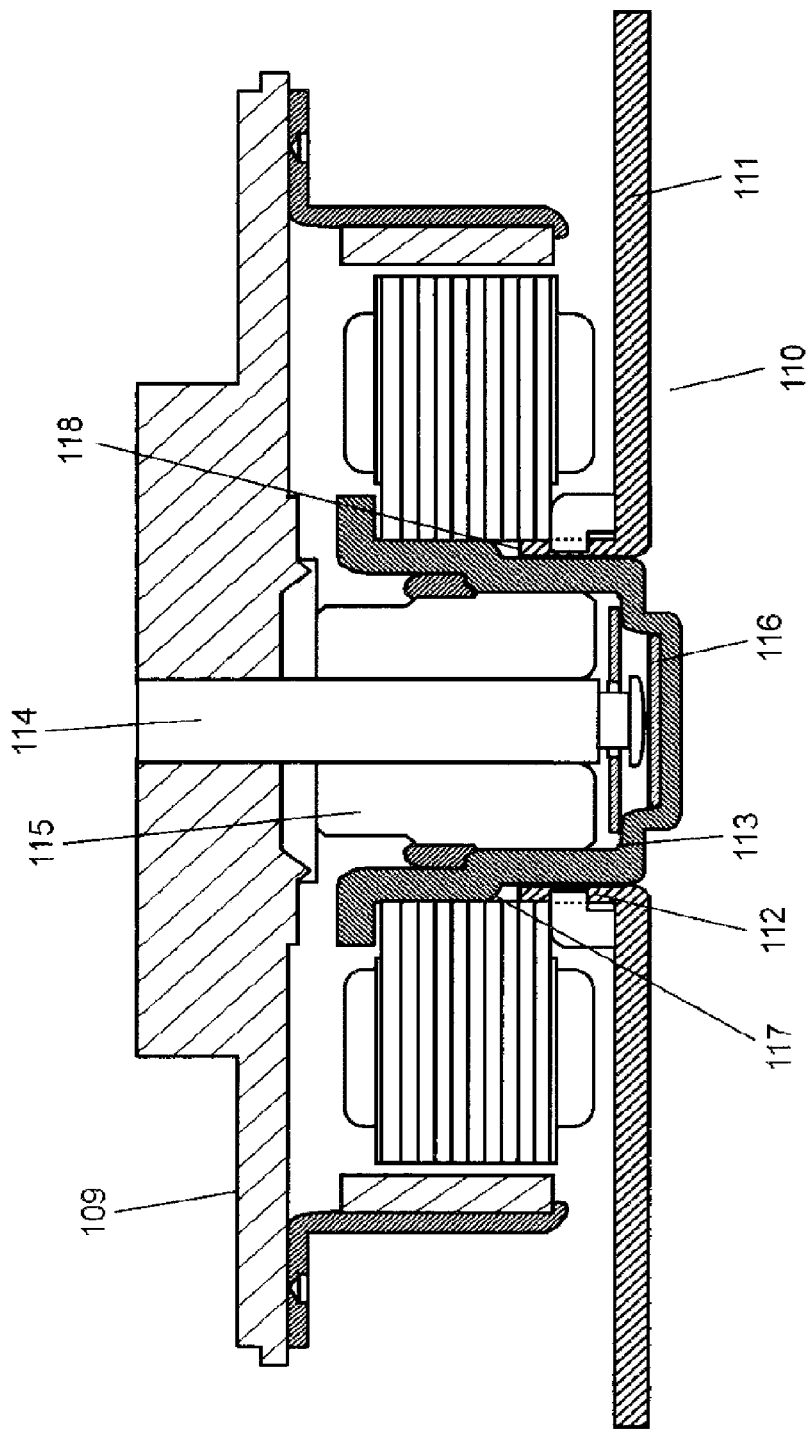
FIG. 6 is a sectional view showing a structure of another conventional disk-rotating motor.
Figure 7A:
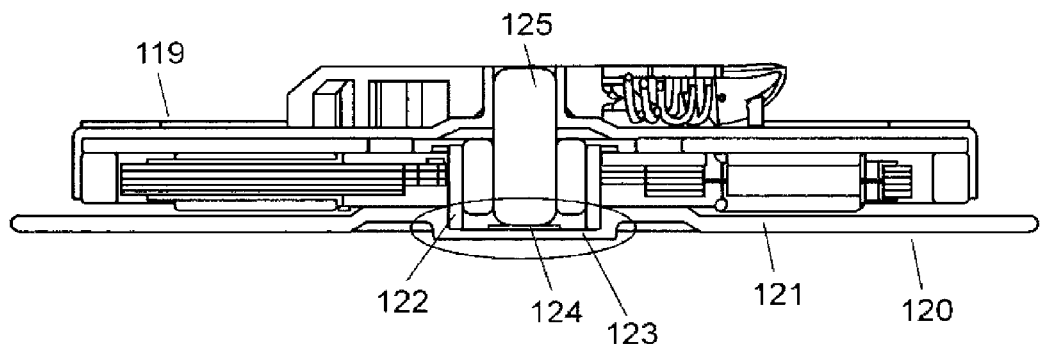
FIG. 7A is a sectional view showing a structure of a conventional disk-rotating motor.
Figure 7B:
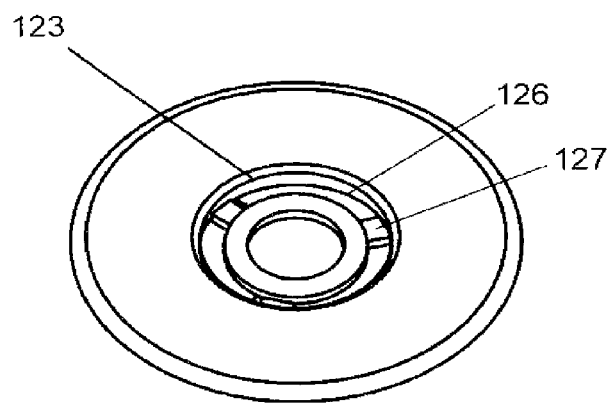
FIG. 7B is an enlarged perspective view of a recess part of a bracket.

FIG. 4 is an enlarged sectional view showing a vicinity of a bracket-side end part of the shaft-bearing housing 8 in an embodiment of the present invention. As shown in FIG. 4, a bracket-side end part of the shaft-bearing housing 8 has a substantial L-shaped axial cross-section. Also, as shown in FIG. 4, a gap 24 is formed between an inner diameter part of the L-shaped part 14 and the outer diameter part of the shaft-bearing 7. Also, a gap 25 is formed between a bracket-side end face of the L-shaped part 14 and a shaft-bearing side face of the bracket 12 facing thereto. In this embodiment, a width of the gap 24 is set to be smaller than that of the gap 25. That is, by satisfying a relation of (the width of the gap 24)<(the width of the gap 25), the oil flowing out due to the capillary phenomenon flows into the shaft-bearing housing 8. Thereby, since the oil flowing out due to the capillary phenomenon circulates to the shaft-bearing 7, it is possible to prevent the oil from flowing out to the outside.

As described above, the disk-rotating motor of the present invention includes the rotor section having the rotor magnet attached to the rotor frame and the shaft fixed to the center of the rotor frame, and the stator section having the shaft-bearing which bears the shaft. The stator section has the shaft-bearing, the shaft-bearing housing which holds the shaft-bearing, the thrust plate which bears the shaft in an axis direction, the stator core which is arranged to face the rotor magnet and provided with wire-winding, the core holder which holds the stator core, and the bracket which holds the shaft-bearing housing. The bracket is formed with the projecting part which fixes the shaft-bearing at the central part thereof, the inner diameter part of the shaft-bearing is press-fitted to be tightened to the projecting part, and the outer diameter part of the shaft-bearing housing is adhered to be tightened to the inner diameter part of the core holder.

Since the disk-rotating motor of the present invention is configured as described above, only the bracket supports the load of the rotor section in a thrust direction and the holding force thereof is not influenced by the member tightening, so that it is possible to secure the sufficient holding strength. Also, since the bracket can be integrally formed by the press processing, the member is relatively inexpensive, the number of parts can be reduced and the assembling operability is also improved. Also, since the inner diameter part of the shaft-bearing becoming a rotational center of the motor is directly press-fitted, the distance variation from the motor fixing position to the rotational center can be secured just by the precision of the single item of the bracket, so that the high precision can be secured.

Also, as described above, the disk-rotating motor can be embedded in a disk-rotating device, so that it is possible to realize a disk-driving device for vehicle mount having superior shock and vibration resistances.

Industrial Applicability

The present invention is useful for a brushless motor for a mobile device and for vehicle mount which require the high reliability, the high precision and the low cost in addition to the size-reduction and the thinning, such as a spindle motor for an optical medium.

Description of Reference Numerals
1: turntable part
2: rotor frame
3: disk-aligning member
4: rotor magnet
5, 105, 114, 125: shaft
6, 101, 109, 119: rotor section
7, 106, 115: shaft-bearing
8, 113, 122: shaft-bearing housing
9, 108, 116, 124: thrust plate
10: wire
11: stator core
12, 103, 111, 121: bracket
13, 102, 110, 120: stator section
14: L-shaped part
20: core holder
21: projecting part a central part of a bracket
22: notch
23: groove
24: gap between an inner diameter of the L-shaped part and an outer diameter of the shaft-bearing
25: gap between a bracket-side end face of the L-shaped part and a shaft-bearing side face of the bracket 12 facing thereto
123: recess part for fitting
126: groove part for fitting
127: projecting part for welding
104, 112: burring part
107: thrust cap
117: step part
118: burring part end face

The invention claimed is:

1. A disk-rotating motor comprising:
 a rotor section including a rotor magnet attached to a rotor frame and a shaft fixed to a center of the rotor frame; and
 a stator section including a shaft-bearing which bears the shaft,
 wherein the stator section includes the shaft-bearing, a shaft-bearing housing which holds the shaft-bearing, a thrust plate which bears the shaft in an axis direction, a stator core which is arranged to face the rotor magnet and provided with wire-winding, a core holder which holds the stator core, and a bracket which holds the shaft-bearing housing, and
 wherein the bracket is formed with a projecting part which fixes the shaft-bearing at a central part thereof, an inner diameter part of the shaft-bearing is press-fitted to be tightened to the projecting part, and an outer diameter part of the shaft-bearing housing is adhered to be tightened to an inner diameter part of the core holder.

2. The disk-rotating motor according to claim 1,
 wherein a notch is formed at an outer periphery of the projecting part formed at the central part of the bracket.

3. The disk-rotating motor according to claim 1,
 wherein a bracket contact surface of the shaft-bearing is formed with a groove.

4. The disk-rotating motor according to claim 1,
 wherein a bracket-side end part of the shaft-bearing housing has a substantial L-shaped axial cross-section, and
 wherein a width of a gap formed between an inner diameter part of an L-shaped part having the L shape and an outer diameter part of the shaft-bearing is smaller than a width of a gap formed between a bracket-side end face of the L-shaped part and a shaft-bearing side face of the bracket facing thereto.

5. A disk-driving device including the disk-rotating motor according to claim 1 mounted thereto.

* * * * *